United States Patent [19]

Gerke et al.

[11] Patent Number: 4,541,682
[45] Date of Patent: Sep. 17, 1985

[54] CONNECTOR BLOCK WITH SOLDERLESS, NON-SCREWED AND STRIPPING-FREE TERMINALS HAVING A POLYTROPIC AIR GAP FOR TERMINATING COMMUNICATION CABLES AND DROPWIRE CABLES

[75] Inventors: Dieter Gerke; Manfred Müller; Peter Zytowski; Wolfgang Radelow, all of Berlin, Fed. Rep. of Germany

[73] Assignee: Krone GmbH, Berlin, Fed. Rep. of Germany

[21] Appl. No.: 632,210

[22] Filed: Jul. 18, 1984

[30] Foreign Application Priority Data

Apr. 25, 1984 [DE] Fed. Rep. of Germany ....... 3415369

[51] Int. Cl.[4] .............................................. H01R 13/53
[52] U.S. Cl. ................................... 339/111; 339/14 R; 339/99 R
[58] Field of Search ...................... 339/14 R, 14 L, 97, 339/98, 111, 99 R

[56] References Cited

U.S. PATENT DOCUMENTS

| 3,772,635 | 11/1973 | Rudisill et al. | 339/111 X |
| 4,023,883 | 5/1977 | Raposa et al. | 339/98 |
| 4,099,822 | 7/1978 | Carlisle et al. | 339/98 |
| 4,253,717 | 3/1981 | Stewart | 339/111 X |

FOREIGN PATENT DOCUMENTS 3214896  10/1983  Fed. Rep. of Germany .

Primary Examiner—Eugene F. Desmond
Attorney, Agent, or Firm—Weingarten, Schurgin, Gagnebin & Hayes

[57] ABSTRACT

The subject matter of the invention is a connector block (1) with solderless, non-screwed and stripping-free terminal elements (2, 3) having a polytropic air gap, for terminating dropwire cables (6) and cable wires (7). The terminal elements (2, 3), which comprise a terminal contact (2b, 3b) and a center contact (2a, 3a), have a semi-circular extension (2a') on the underside (2') of the center contact (2a, 3a), the spacing of said semi-circular extension relative to an earth bar (4) mounted in the housing lower half (12) being variable by tilting the earth bar (4) about 180°; said earth bar (4) is adapted to be mounted at either of two different levels. Thereby it is possible to select a high-voltage spark-gap function.

12 Claims, 7 Drawing Figures

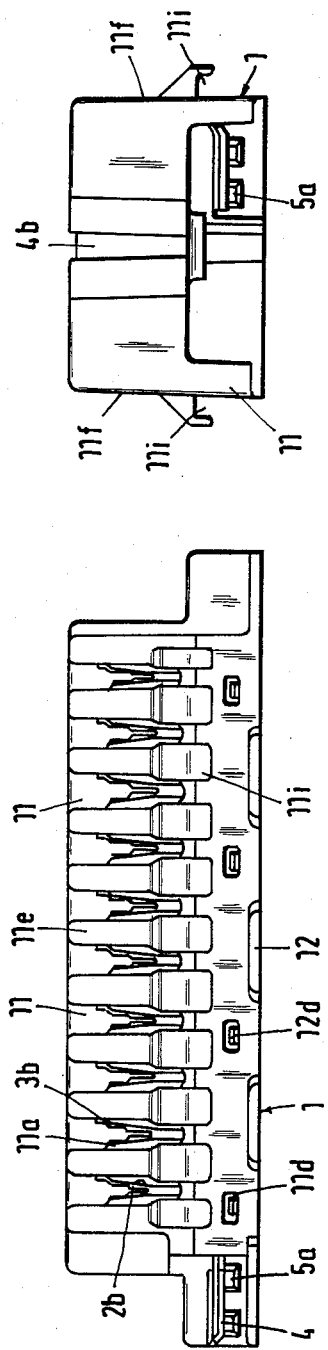

CONNECTOR BLOCK WITH SOLDERLESS, NON-SCREWED AND STRIPPING-FREE TERMINALS HAVING A POLYTROPIC AIR GAP FOR TERMINATING COMMUNICATION CABLES AND DROPWIRE CABLES

The invention relates to a connector block with solderless, non-screwed and stripping-free terminals having a polytropic air gap (briefly LSA-PLUS terminals) for the termination of communication cables, comprising a housing upper half and a housing lower half.

The connector blocks are mounted in cable distribution heads or any other built-in devices. Chiefly, they are employed where there is a transition between dropwire cables and cable wires.

An LSA-PLUS terminal for terminating a cable wire and a dropwire cable, i.e., for terminating two cables having different wire sizes, has been known from the DE-PS No. 3,214,896.

Therein, the terminal comprises in the central portion of a contact slot a second contact slot formed to the left and the right and having U-shaped configuration. Above the U-shaped slot said slot has a larger width for termination of a dropwire cable than beneath said U-shaped slot, the narrower contact slot being intended for termination of a cable wire.

This advantageous terminal, in which two cables having different wire sizes may be simultaneously terminated, is also to be used in the connector block according to the instant invention.

It is therefore the object of the instant invention to provide a connector block with terminal elements which permits the termination of several dropwire cables and cable wires by the use of the known terminals. Moreover, provision is to be made for installing, if desired, a high-voltage spark-gap and for plugging on an arrester magazine or a test connector.

In accordance with the instant invention, the above-specified object is solved in that the connector block receives angular pairs of terminal elements respectively rotated about 180° in separate receptacles of the housing upper half and the housing lower half in plugged-in relationship, that each of said terminal elements in addition to a terminal contact includes a centre contact with a semi-circular extension integrally formed therewith on the underside thereof, that centrally of the longitudinal axis of the connector block within the housing lower half a groove is formed including plural receptacles formed with two different stepped shoulders, that an earth bar rotatable about 180° is adapted to be inserted into said groove at two different levels, and that the earth bar is formed with tabs engaging in said receptacles.

Therefore provision is made for mounting in the housing lower half of the connector block an earth bar which may take either of two positions at different levels by being rotated or tilted about 180°; thereby the spacing between the earth bar and a semi-circular extension disposed on the centre contact member of the terminal element is varied.

When a defined spacing is adjusted, a high-voltage spark-gap function is provided which in case of overvoltages will ensure a defined flash-over.

Advantageous further embodiments of individual measures of the invention are characterized in the subclaims.

An embodiment of the invention will be explained in detail below with reference to the accompanying drawing, in which:

FIG. 1 is the principal view of the connector block,

FIG. 2 is a side view of the arrangement shown in FIG. 1,

FIG. 7 is the connector block with the arrester magazine and the test connector plugged on.

Figure 3:
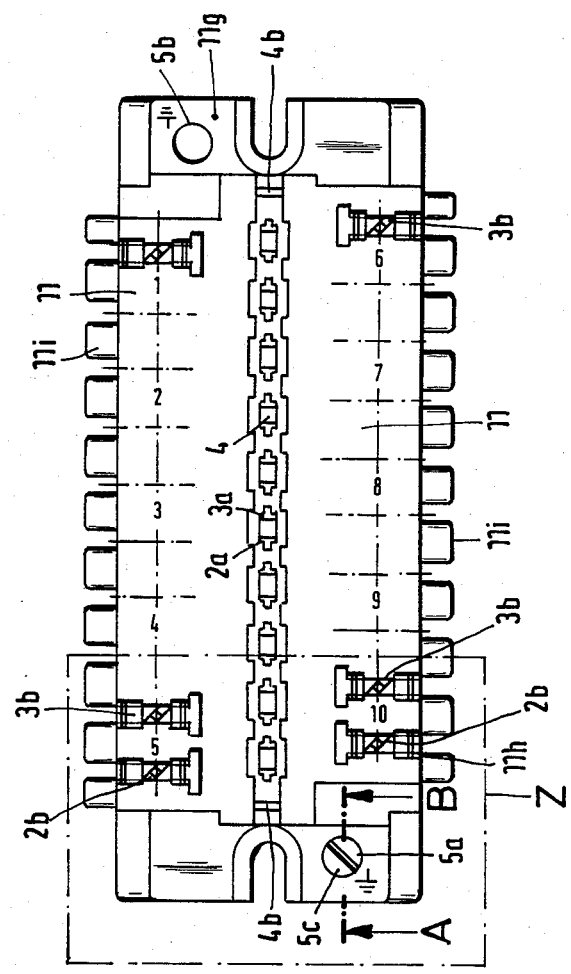
FIG. 3 is a plan view of the arrangement shown in FIG. 1.

Five pairs of wires may be terminated respectively on the subscriber's side and the drop side of the connector block 1 shown in the three views of FIGS. 1 to 3. Each terminal 2b, 3b is capable of terminating two wires, viz., a thicker dropwire cable 6 and a thinner cable wire 7, as is particularly shown in FIG. 4.

Figure 4:
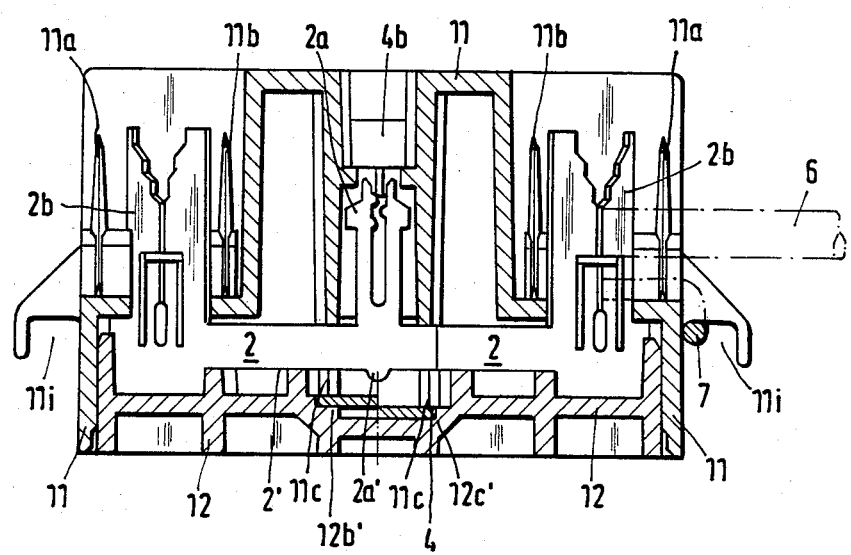
FIG. 4 is a side view of the connector block in a sectional view with a non-plane section curve.

As is shown in FIG. 1 and especially in FIG. 4, clamping ribs 11a, 11b each extending centrally on either side of the terminal member 2b, 3b are provided for locking the dropwire cable 6 and the cable wire 7 in their positions and for providing strain relief therefor.

Limiting slots 11h for limiting the insertion depth of the dropwire cables 6 relative to the cable wire region are formed on the receptacles 13 of the housing upper half 11 and the housing lower half 12 of the connector block 1.

The side faces 11f of the housing upper half 11 of the connector block 1 are provided with protective channels 11i formed by an extension of the intermediate wall 11e, said protective channels 11i being used to accommodate the cable wires 7, whereby it is ensured that upon withdrawal of dropwires 6 the cable wires 7 cannot accidentally be removed as well.

Upon joining of the housing upper half 11 and the housing lower half 12, the detents 12d provided on either of the longitudinal sides of the housing lower half 12 engage in the corresponding mating openings 11d provided on the housing upper half 11.

The separate receptacles 13 provided in the housing upper half 11 and the housing lower half 12 each include two diagonally opposed retaining slots 13a, 13b. These retaining slots 13a, 13b are intended to receive the LSA-PLUS terminals 2b and 3b, respectively.

The terminal contact slots are correspondingly offset at an angle of about 45° to the dropwire cable 6 and the cable wire 7, respectively.

As is shown in FIG. 4, the terminal element 2 and 3, respectively, comprises a terminal contact 2b and 3b, respectively, and a centre contact 2a and 3a, respectively.

Figure 5:
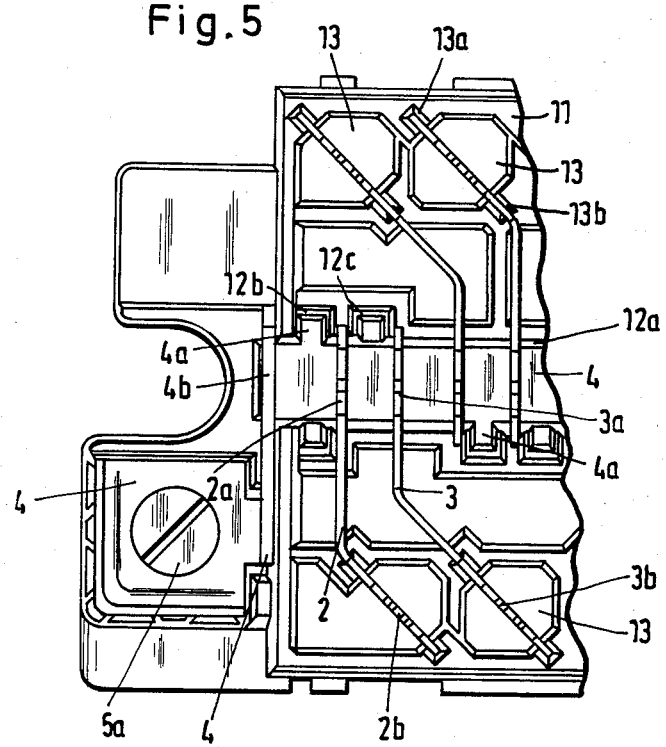
FIG. 5 is an enlarged view of the detail Z of FIG. 3 with the housing upper half being removed.

As will be apparent from FIG. 5, the pairs of LSA-PLUS terminal elements 2, 3 are of angular configuration. They are mounted in two rows respectively rotated by 180°. In order to ensure the defined pitch, the terminal elements 2 and 3 have different arm lengths, as indicated particularly in FIG. 5.

The arm length of the centre contact 2a of the terminal element 2 is equal to the arm length of the terminal contact 3b of the terminal element 3. The arm length of the terminal contact 2b of the terminal element 2 is equal to the arm length of the centre contact 3a of the terminal element 3.

Each centre contact 2b and 3b, respectively, has a semicircular extension 2a' formed integral therewith on the underside 2' thereof, as shown in FIG. 4.

It is further apparent from FIG. 5 that centrally of the longitudinal axis of the connector block 1 a groove 12a including a plurality of receptacles 12b, 12c is provided in the housing lower half 12.

As will be apparent from FIG. 4, said receptacles 12b, 12c are formed with two different stepped shoulders 12b', 12c'. Said stepped shoulders 12b', 12c' are required for adjusting a high-voltage spark-gap; for as will be apparent from FIGS. 4 and 5, an earth bar 4 is inserted into the groove 12a. Said earth bar 4 is formed with plural tabs 4a adapted to engage in the receptacles 12b, 12c and thus resting on the stepped shoulders 12b', 12c'.

This means that the earth bar 4 may be provided at one of two different levels in accordance with its mounting position.

Thereby the spacing between the earth bar 4 and the semicircular extension 2a' provided on the centre contact 2a and 3a, respectively, is determined.

FIG. 4 shows both mounting positions. The left part of the drawing shows the earth bar 4 with a high-voltage spark-gap function. The right part of the drawing shows the earth bar 4 in the normal condition.

For fixing and maintaining the position of the earth bar 4, pins 11c having two different lengths are integrally formed with the housing upper half 11, said pins bearing on the tabs 4a irrespective of the mounting position of the earth bar 4.

Figure 7:
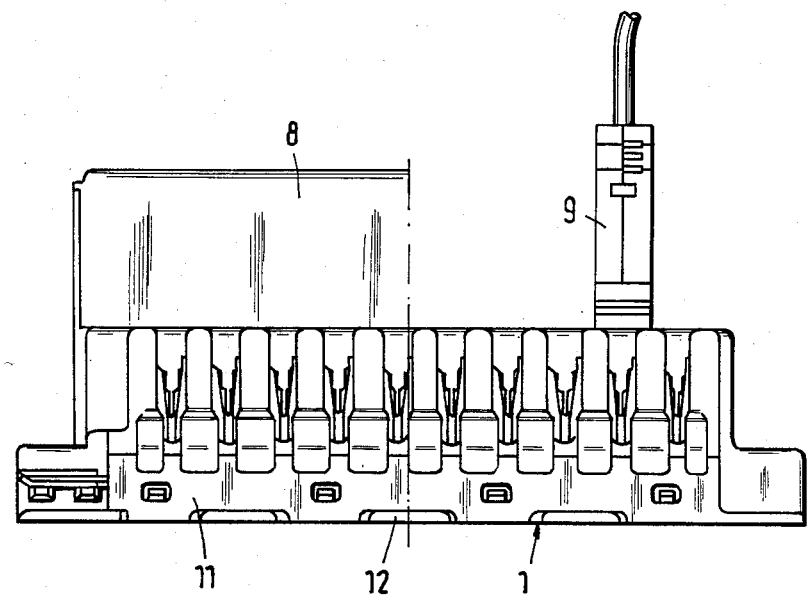

As will be apparent from FIGS. 2, 3, and 5, the ends of the earth bar 4 are integrally formed with lugs 4b projecting into the housing upper half 11, said lugs being intended for tapping an insertable arrester magazine 8 (FIG. 7).

As will be apparent from FIG. 5, the earth bar 4 is angled to S-shape towards the end faces of the connector block 1.

Here, a connecting means 5 consisting of an earthing screw 5a is provided.

Figure 6:
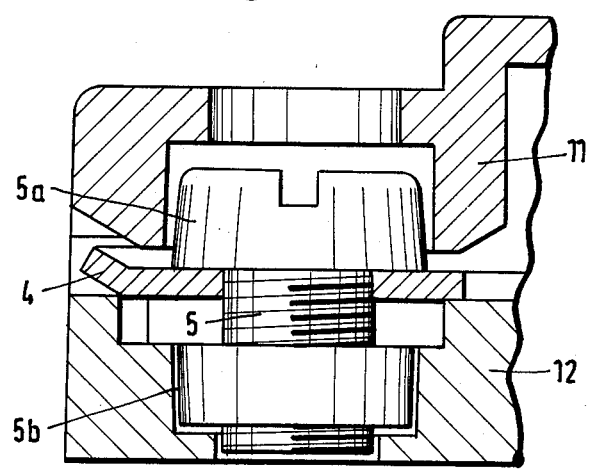
FIG. 6 is a sectional view of the earthing screw according to the sectional line A–B in FIG. 3.

Depending on the mounting position of the earth bar 4, the connecting means 5 shown in FIG. 6 is mounted either in a receptacle 5b or a receptacle 5c, as shown in FIG. 3.

For an optical indication of the mounting position of the earth bar 4, a marking 11g is provided on the housing upper half 11 (FIG. 3).

The marking 11g indicates the existence of a high-voltage spark-gap function.

FIG. 7 shows that an arrester magazine 8 or a test connector 9 may be plugged into the centre contacts 2a, 3a centrally of the connector block 1. The test connector 9 has the function of connecting the subscriber's lines via cord circuits to testing and measuring devices, changed-number interceptions and other exchange equipment.

We claim:

1. A connector block with solderless, non-screwed and stripping-free terminals having a polytropic air gap for terminating communication cables, comprising a housing upper half and a housing lower half, characterized in that the connector block (1) receives angular pairs of terminal elements (2, 3) respectively rotated about 180° in separate receptacles (13) of the housing upper half (11) and the housing lower half (11) in plugged-in relationship, that each of said terminal elements (2, 3) in addition to a terminal contact (2b, 3b) includes a centre contact (2a, 3a) with a semi-circular extension (2a') integrally formed therewith on the underside (2') thereof, that centrally of the longitudinal axis of the connector block (1) within the housing lower half (11) a groove (12a) is formed including plural receptacles (12b, 12c) formed with two different stepped shoulders (12b', 12c'), that an earth bar (4) rotatable about 180° is adapted to be inserted into said groove (12a) at two different levels, and that the earth bar (4) is formed with tabs (4a) engaging in said receptacles (12b, 12c).

2. A connector block as claimed in claim 1, characterized in that the centre contact (2a) of one (2) of said terminal elements of said pair and the terminal contact (3b) of the other (3) terminal element of said pair have the same arm length (FIG. 5).

3. A connector block as claimed in claim 1, characterized in that the terminal contact (2b) of the one terminal element (2) of said pair and the centre contact (3a) of the other terminal element (3) have the same arm length (FIG. 5).

4. A connector block as claimed in claim 1, characterized in that on either side of the terminal contact (2b, 3b) centrally extending pairs of clamping ribs (11a, 11b) are provided on the housing upper half (11) of the connector block (1).

5. A connector block as claimed in claim 1, characterized in that limiting slots (11h) are provided on the receptacles (13).

6. A connector block as claimed in claim 1, characterized in that a protective channel (11i) is formed on one side surface (11f) of the housing upper half (11) by an extension of an intermediate wall (11e).

7. A connector block as claimed in claim 1, characterized in that on one end face of the connector block (1) the earth bar (4) is angled to form an S and is provided with connecting means (5) including an earthing screw (5a).

8. A connector block as claimed in claim 7, characterized in that both ends of the earth bar (4) are integrally formed with lugs (4b) projecting into the housing upper half (11).

9. A connector block as claimed in claim 1, characterized in that the housing upper half (11) is integrally formed with pins (11c) having two different lengths, said pins bearing on the tabs (4a) of the earth bar (4).

10. A connector block as claimed in claim 1, characterized in that a marking (11g) indicates the mounting position of the earth bar (4) for a high-voltage spark-gap function.

11. A connector block as claimed in claim 1, characterized in that four detents (12d) respectively integrally formed on either side of the housing lower half (12) engage in corresponding openings (11d) formed in the housing upper half (11).

12. A connector block as claimed in claim 1, characterized in that each of the receptacles (13) provided in the housing upper half (11) and in the housing lower half (12) is respectively provided with two diagonally opposite retaining slots (13a, 13b).

* * * * *